United States Patent [19]

Lechter

[11] 4,191,421
[45] Mar. 4, 1980

[54] SIDE COLLISION SAFETY SEAT BELT STRUCTURE

[76] Inventor: George S. Lechter, 99 Pond Ave., Apt. 205, Brookline, Mass. 02146

[21] Appl. No.: 893,293

[22] Filed: Apr. 5, 1978

[51] Int. Cl.² ............................................ A62B 35/00
[52] U.S. Cl. ...................... 297/483; 280/808
[58] Field of Search ............... 297/385, 389, 388; 280/744, 747

[56] References Cited

U.S. PATENT DOCUMENTS

| 2,905,231 | 9/1959 | Olson | 280/744 |
| 3,146,027 | 8/1964 | Winberg | 297/385 |
| 3,168,158 | 2/1965 | Schoeffler et al. | 280/744 X |
| 3,241,205 | 3/1966 | Genin | 280/744 X |
| 3,897,963 | 8/1975 | Seiffert | 297/389 X |

FOREIGN PATENT DOCUMENTS 2323404  4/1977  France ................................ 297/385

*Primary Examiner*—James T. McCall
*Attorney, Agent, or Firm*—Charles Hieken

[57] ABSTRACT

A seat belt structure mountable in a vehicle which provides a delayed release to the seat belt when the attached vehicle is struck from the side adjacent the seat about which the structure is mounted so as to avoid entrapment of a belted occupant of the seat. The inner side of the structure is fitted with a first seat belt, the free end of which is attachable to a second seat belt fastened adjacent an outer side of the vehicle with the fixed end of the first seat belt detachably fastened by a latch pin fixed to a lateral bar extending under the seat and joined at the outer side of the seat to a longitudinal arm. A collision force applied sidewards against the longitudinal arm and lateral bar towards the center of the vehicle moves the latch pin out of engagement with the first seat belt end so as to free the first seat belt end.

4 Claims, 5 Drawing Figures

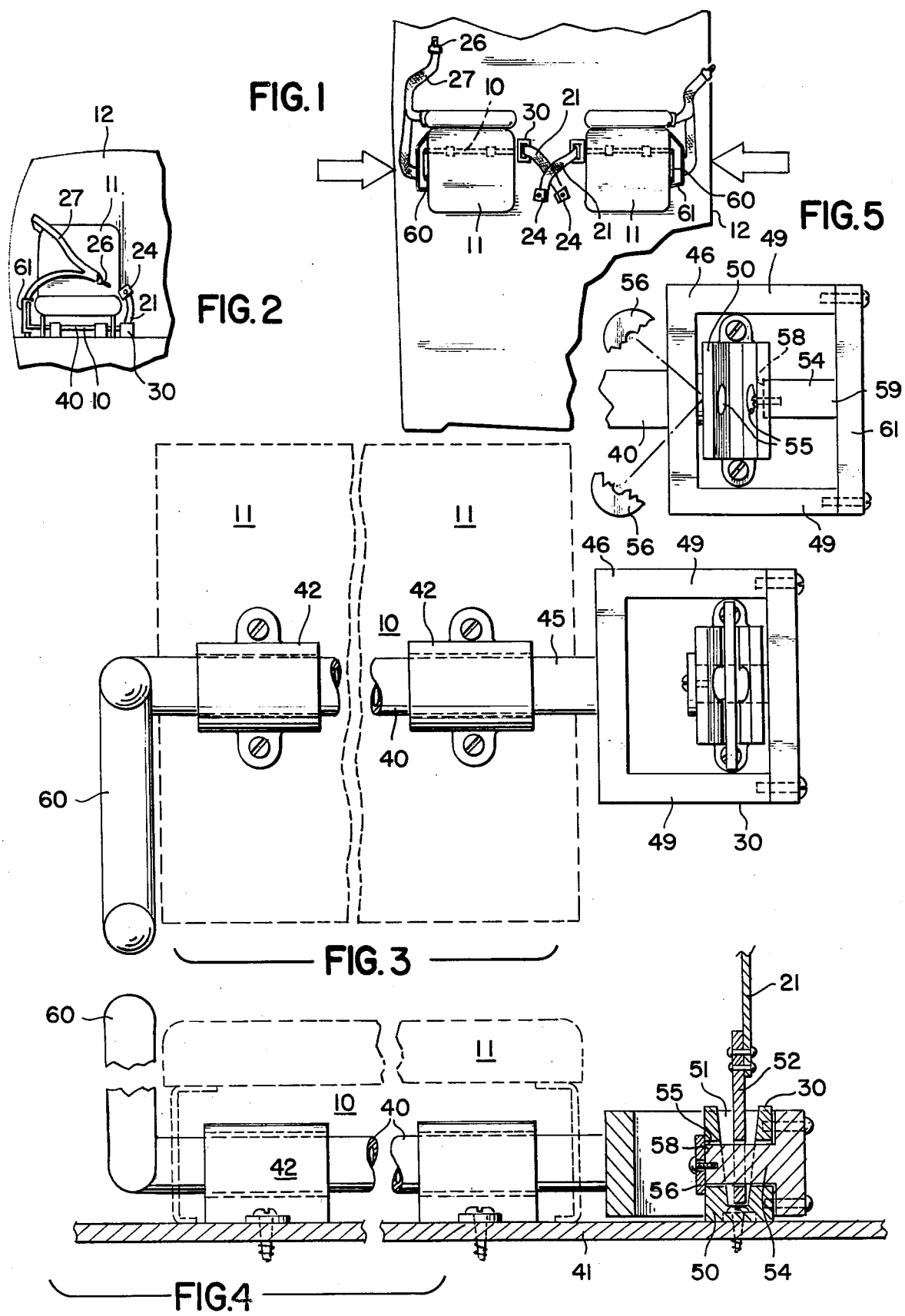

SIDE COLLISION SAFETY SEAT BELT STRUCTURE

STATEMENT OF PRIOR ART

Seat belt fastening structures are disclosed in U.S. Pat. Nos. 3,116,092; 3,637,259; 3,734,562; 3,877,748; and 4,006,934.

However, none of these structures provide the safety features of the applicant's invention nor disclose the novel structure of the applicant's invention described herein.

SUMMARY OF THE INVENTION

My invention is a seat belt structure mountable in a vehicle which provides a delayed release to the seat belt when the attached vehicle is struck from the side adjacent the seat about which the structure is mounted so as to avoid entrapment of a belted occupant of the seat. The central side of the structure is fitted with a first seat belt, the free end of which is attachable to a second seat belt fastened adjacent an outer side of the vehicle with the fixed end of the first seat belt detachably fastened by a latch pin fixed to a lateral bar extending under the seat and joined at the outer side of the seat to a longitudinal arm. A collision force applied sidewards against the longitudinal arm and lateral bar towards the center of the vehicle moves the latch pin out of engagement with the first seat belt end so as to free the first seat belt end.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a plan view of the invention, in use;

FIG. 2 is a front view of the invention, in use;

FIG. 3 is a plan view of the invention;

FIG. 4 is a front view of the invention; and

FIG. 5 is a detail plan view of the invention in the unlatched mode.

DESCRIPTION OF THE PREFERRED EMBODIMENT

Turning now descriptively to the drawings, in which similar reference characters denote similar elements throughout the several views, FIGS. 1-2 illustrate a seat 11 in a vehicle 12 fitted with the seat belt structure 10 of the invention which is illustrated in FIGS. 3-5.

A first seat belt 21 is detachably fastened to the structure 10 and fitted at its free end with a convention clasp 24 for detachable juncture with a conventional hasp 26 of a second seat belt 27 permanently fixed to the seat or the vehicle body at the outer side of the seat 11.

In describing this invention, the directional term "outer side" will represent the side of a seat 11 adjacent the external side on door of the vehicle and the directional term "inner side" will represent the side of the seat opposed to said outer side.

Clasp 24 and hasp 26 are designed to matingly latch with each other and to be detachable only by conventional means requiring manual manipulation of the clasp or hasp. However, the joint structure 30 of the first seat belt 21 with the structure 10 is designed to free belt 21 from structure 10 when, and only when, the vehicle is struck and collapses from a lateral external blow on the vehicle frame or door adjacent the outer side of a specific seat 10, which blow is directed laterally towards the mid-section of the car.

A lateral bar 40 extends under seat 11 and is slidably mounted to the vehicle floor or floor frame 41 by brackets 42 permitting bar 40 to slide along the longitudinal axis of the bar which is the transverse axis of the vehicle 12.

The inner side end 45 of bar 40 is fixed to a U-shape yoke 46 that extends about a clasp bracket 50 which is fixed to the floor frame 41. Clasp bracket 50 is formed with a recess 51 open to the top of bracket 50 of a size to permit free entry of a hasp 52 fixed to seat belt 21. A pin 54 extends laterally through an opening 55 in hasp 52 and similar through openings 55 in bracket 50 so as to anchor hasp 52 to bracket 50. A frangible washer 56 larger than an opening 55 is externally fixed to the outer side end 58 of pin 54 externally of bracket 50. The inner side end 59 of pin 54 is externally joined to a T-bar 61 bolted at each end to an end of a leg 49 of yoke 46. Pin 54 and yoke legs 49 are each of a length so that when bar 40 is in a first position shown in FIGS. 3 and 4 at the limit of lateral travel towards the outer side, pin 54 is engaged through both openings 55 of bracket 50 and engaged to hasp 52; with pin 54 and legs 49 of a length so that with bar 40 in a second position shown in FIG. 5 at the limit of travel towards the inner side, pin 54 is free of engagement with hasp 52 and is drawn laterally out of recess 51 of clasp bracket 50 to permit hasp 52 to be freely withdrawn from engagement with bar 54 and clasp bracket 50.

Lateral bar 40 is joined at its outer end beyond seat 11 to a longitudinal arm 60 that extends parallel to the outer side of seat 11. Arm 60 may be enclosed by a frangible protective shield 61 fixed to the floor frame or the seat.

It will be seen that in the installed mode, seat belt 21 is fixed to latch pin 54 of bar 40 when the vehicle 12 is in a normal condition or impacted from the front, rear or inner side of the respective seat 11. However, when vehicle 12 is impacted from the outer side of the respective seat 11 so as to crush the side of the vehicle inwards and trap the occupant of the seat 11, pin 54 travels inward to release belt 21 permitting the occupant of the respective seat 11 to be freed from the belt and the crushed wreckage, as the crushed exterior side of the vehicle moves against arm 60 in an inwards direction.

It is also to be noted that there is an appreciable time delay from the initial instant of impact to the release of the seat belt 21 so that an occupant of seat 11 fastened about by belt 27 joined to belt 21, is initially restrained by the joined belts during the initial period of such a sidewise collision. The time delay period is a function of the distance separating the exterior side frame of the vehicle from arm 60 plus the distance pin 54 must travel laterally prior to disengaging from hasp 52. In the event that such a sidewise collision does not collapse the side of the car sufficiently to cause the side of the car to endanger the occupant of the seat, the seat belt will not be released by the structure 10.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A seat belt mounting structure for use in a vehicle which disengages a fastened seat belt under a condition of a sidewise impact to the vehicle so as to prevent entrapment of an occupant of a seat in the vehicle who is fastened to the seat by the seat belt, comprising a seat belt fitted with first detachable means to fasten about an occupant of a seat in a vehicle, said seat belt fitted with second detachable means to fasten to the frame of the vehicle adjacent an inner side of the seat, said second detachable means responsive to lateral movement of a member thereof in the direction away from the outer side of said seat and towards the inner side of said seat such that a given amount of said movement caused by a sidewise impact upon said vehicle serves to disengage the seat belt from said second detachable means while normally keeping said second detachable means engaged with said seat belt in the absence of a sidewise impact upon said vehicle.

2. The combination as recited in claim 1, in which said second detachable means includes a first member extending from the outer side of the seat to the inner side of the seat, with said member fitted at its inner side end with means to fasten an end of the seat belt to a bracket fixed to the frame of the vehicle, when the said member is in a first position of lateral travel, said means being disengaged from the end of the seat belt in a second position of travel, with said second position of travel being in the lateral direction away from the outer side of the seat and towards the inner side of the seat.

3. The combination as recited in claim 2, in which the first member is fitted with frangible means to retain said first member in the first position of lateral travel.

4. In a vehicle having occupant restraining means for restraining movement of a vehicle occupant upon the occurrence of a crash or sudden stop the improvements comprising, means responsive to a significant sideward component of force being applied to said vehicle upon occurrence of an external object colliding with the vehicle side for releasing the occupant from said occupant restraining means upon occurrence of the collision with the vehicle side while normally restraining the occupant with said occupant restraining means in the absence of a collision of an external object with the vehicle side.

* * * * *